United States Patent
Gulnick

(10) Patent No.: US 9,650,789 B2
(45) Date of Patent: May 16, 2017

(54) ATTACHMENT BRACKETS FOR PANEL MOUNTING

(71) Applicant: James Reid Gulnick, Voorhees, NJ (US)

(72) Inventor: James Reid Gulnick, Voorhees, NJ (US)

(*) Notice: Subject to any disclaimer, the term of this patent is extended or adjusted under 35 U.S.C. 154(b) by 0 days.

(21) Appl. No.: 14/953,958

(22) Filed: Nov. 30, 2015

(65) Prior Publication Data

US 2016/0230793 A1 Aug. 11, 2016

Related U.S. Application Data

(60) Provisional application No. 62/114,315, filed on Feb. 10, 2015.

(51) Int. Cl.
| | | |
|---|---|---|
| *E04B 2/74* | (2006.01) | |
| *E04F 13/08* | (2006.01) | |
| *E04B 9/00* | (2006.01) | |
| *E06B 3/54* | (2006.01) | |
| *E04B 5/00* | (2006.01) | |

(Continued)

(52) U.S. Cl.
CPC ........ *E04F 13/0801* (2013.01); *E04F 13/083* (2013.01); *A47F 5/0846* (2013.01); *A47F 5/0853* (2013.01); *A47F 5/0861* (2013.01); *E04F 13/088* (2013.01); *E04F 13/0864* (2013.01); *E04F 2201/027* (2013.01);
(Continued)

(58) Field of Classification Search
CPC . E04F 13/083; E04F 13/0851; E04F 2201/04; E04F 13/088; E04F 13/0801; E04F 13/0885; E04B 9/22; E04B 9/24; E04B 9/26; E04B 9/28; A47F 5/0846; A47F 5/0853; A47F 5/0861
USPC .............. 248/220.42, 220.21, 221.11, 23.41, 248/223.41; 52/36.5, 235, 478, 489.2, 52/506.1; 211/87.01; 24/584.1
See application file for complete search history.

(56) References Cited

U.S. PATENT DOCUMENTS 2,628,078 A * 2/1953 Krauss .................... F24D 3/165
165/56
3,117,353 A * 1/1964 Edwards ............. E04F 13/0835
248/225.21

(Continued)

OTHER PUBLICATIONS

MF375 Clip. (n.d.). Retrieved Nov. 30, 2015, from http://www.monarchmetal.com/products/mf375-z-clips/.
(Continued)

*Primary Examiner* — Brian Mattei
*Assistant Examiner* — Taylor Morris
(74) *Attorney, Agent, or Firm* — Dunlap Bennett & Ludwig PLLC

(57) ABSTRACT

Mounting brackets used for mounting decorative panels to walls is provided. The mounting brackets may each include a substantially planar body having a front surface, a rear surface, a top end and a bottom end forming a height in between, and a first end and a second end, forming a length in between. The mounting brackets further include at least one hook rail protruding from the front surface of the body at an angle relative to the front surface. The hook rail runs along at least a portion of the length of the body. A hook rail of a first bracket interlocks with a hook rail of a second bracket when the second bracket is disposed in an upside position relative to the first bracket.

3 Claims, 4 Drawing Sheets

(51) Int. Cl.
*E04B 2/00* (2006.01)
*A47B 96/06* (2006.01)
*A47G 29/00* (2006.01)
*A47K 1/00* (2006.01)
*E04G 3/00* (2006.01)
*E04G 5/06* (2006.01)
*F21V 21/00* (2006.01)
*F21V 35/00* (2006.01)
*A47K 5/00* (2006.01)
*A47F 5/08* (2006.01)
*F16B 5/06* (2006.01)
*F16B 5/07* (2006.01)

(52) U.S. Cl.
CPC ......... *E04F 2201/04* (2013.01); *F16B 5/0657* (2013.01); *F16B 5/07* (2013.01)

(56) References Cited

U.S. PATENT DOCUMENTS

| | | | | | |
|---|---|---|---|---|---|
| 3,621,635 | A | * | 11/1971 | de Lange | E04F 13/083 29/460 |
| 3,672,622 | A | * | 6/1972 | Breslow | F16B 12/56 248/223.41 |
| 3,791,709 | A | * | 2/1974 | Cross | A47B 95/008 248/300 |
| 4,736,918 | A | * | 4/1988 | Bessinger | A47B 96/065 108/152 |
| 5,138,134 | A | * | 8/1992 | Ellison | A47G 1/0616 248/476 |
| 6,113,201 | A | * | 9/2000 | Bauer | A47B 95/008 312/245 |
| 7,004,436 | B2 | * | 2/2006 | Knapp | F16B 5/0032 248/220.22 |
| 7,748,182 | B2 | * | 7/2010 | McGee | E04B 2/7457 52/235 |
| 7,798,463 | B2 | * | 9/2010 | Morgenroth | A47F 5/0846 211/106.01 |
| 7,810,289 | B2 | | 10/2010 | Montgomery | |
| 8,104,726 | B2 | * | 1/2012 | Hoernig | A47K 17/022 248/220.22 |
| 2003/0038222 | A1 | * | 2/2003 | Holmes | A47G 1/1606 248/475.1 |
| 2004/0056167 | A1 | * | 3/2004 | Vogt | A47G 1/164 248/475.1 |
| 2005/0006554 | A1 | * | 1/2005 | DeLine | A47G 1/1606 248/475.1 |
| 2013/0048812 | A1 | * | 2/2013 | Lozano | H05K 5/0204 248/220.22 |
| 2013/0194728 | A1 | * | 8/2013 | Manno | F16M 11/10 361/679.01 |
| 2016/0106214 | A1 | * | 4/2016 | Hagen | H05K 5/0204 361/679.21 |

OTHER PUBLICATIONS

Z Clip System for Installing Glass, ACM or Phenolic Panels. (n.d.). Retrieved Nov. 30, 2015, from http://www.monarchmetal.com/products/phenolic-glass-glazing-panel-hanging-system/.

* cited by examiner

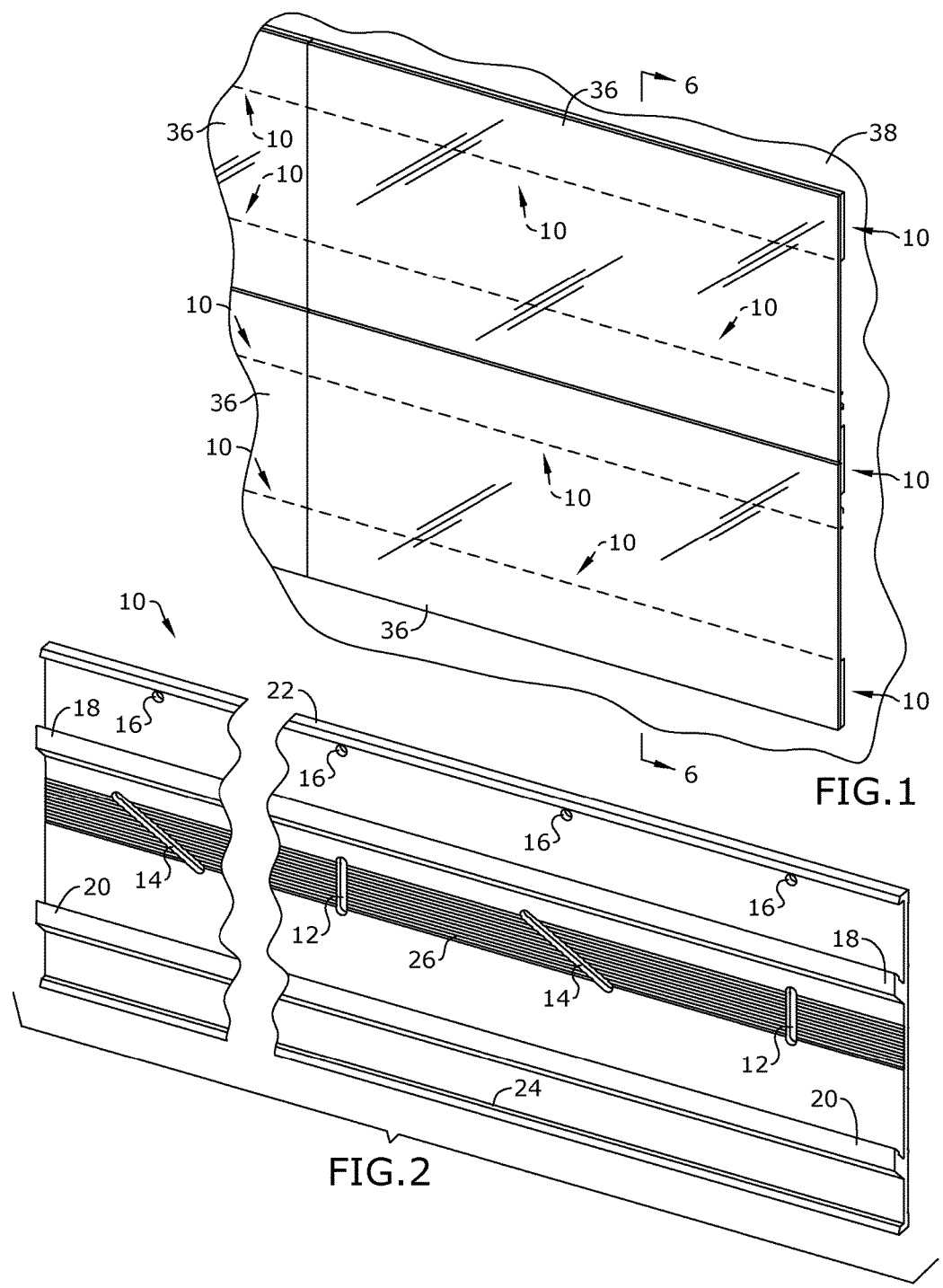

ATTACHMENT BRACKETS FOR PANEL MOUNTING

CROSS-REFERENCE TO RELATED APPLICATION

This application claims the benefit of priority of U.S. provisional application No. 62/114,315, filed Feb. 10, 2015, the contents of which are herein incorporated by reference.

BACKGROUND OF THE INVENTION

The present invention relates to vertically mounting panels to walls and, more particularly, to attachment brackets for vertically mounting panels to walls.

Currently, it is difficult mounting, aligning, and securing glass on vertical walls in a safe, fast, and affordable manner. Current systems require attachment points to be located on the back of glass panels and on walls with metal contacting glass and many attachment points requiring perfect alignment to be effective. Clips may be attached to the glass and wall and require lifting and lowering. The final position of the glass is not adjustable. If the positioning is physically off, then the glass must be removed, the multiple clips adjusted, and the glass replaced to readjust the alignment.

As can be seen, there is a need for improved attachment brackets for mounting panels to walls.

SUMMARY OF THE INVENTION

In one aspect of the present invention, a plurality of mounting brackets each comprising: a substantially planar body comprising a front surface and a rear surface, a top end and a bottom end forming a height in between and a first end and a second end forming a length in between; at least one hook rail protruding from the front surface of the body at an angle relative to the front surface, wherein the at least one hook rail extends along at least a portion of the length of the body; and a plurality of apertures running through the body, each sized to receive a screw therethrough, wherein the at least one hook rail of a first mounting bracket is formed to interlock with the at least one hook rail of a second mounting bracket when the height of the second mounting bracket is disposed in an upside down position relative to the first mounting bracket.

In another aspect of the present invention, a method of mounting a panel to a wall comprises: providing a first mounting bracket comprising a front surface, a rear surface, a plurality of apertures formed therethough, and at least one hook rail protruding from the front surface at an angle relative to the front surface, wherein the at least one hook rail extends along at least a portion of a length of the front surface; providing a second mounting bracket comprising a front surface, a rear surface, and at least one hook rail protruding from the front surface at an angle relative to the front surface, wherein the at least one hook rail extends along at least a portion of a length of the front surface; fastening the rear surface of the first mounting bracket to a wall using a plurality of screws running through the plurality of apertures and into the wall; fastening the rear surface of the second mounting bracket to the panel; and interlocking the at least one hook rail of the second mounting bracket to the at least one hook rail of the first mounting bracket.

These and other features, aspects and advantages of the present invention will become better understood with reference to the following drawings, description and claims.

BRIEF DESCRIPTION OF THE DRAWINGS

FIG. 1 is a perspective view of an embodiment of the present invention, shown in use;

FIG. 2 is a perspective view of an embodiment of the present invention;

DETAILED DESCRIPTION OF THE INVENTION

Figure 3:
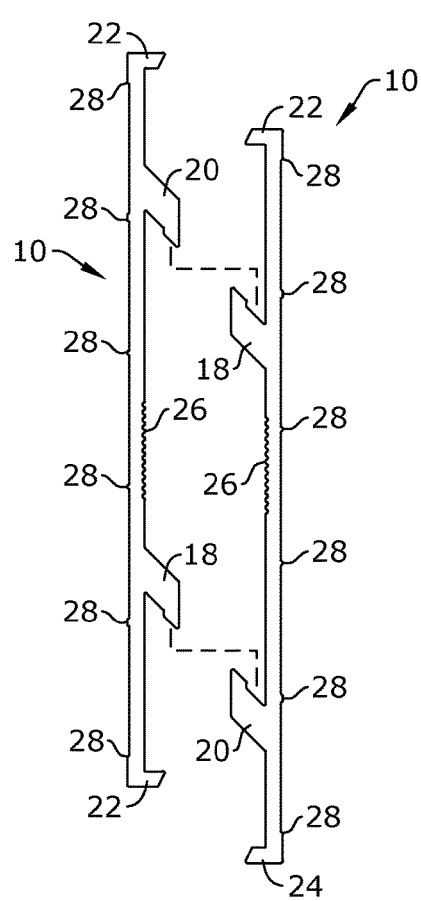
FIG. 3 is a side view of an embodiment of the present invention, showing flush nesting of two mounting brackets.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a means for vertically mounting decorative glass panels. The present invention enables glaziers to mount glass to walls from the front and align glass before physically attaching to the wall in a permanent fashion assuring alignment of each subsequent piece of glass and maintaining parallelism. The mounting system allows each multiple pieces of glass to cover mounting attachment points leaving no exposed mounting mechanism. Further, the panels are interchangeable as the glass is not permanently attached to the walls but simply hooked into place utilizing the mounting system.

The mounting system of the present invention allows glass to be mounted quickly, safely, and economically in an aligned fashion with minimum effort. The system improves on the safety of the finished product as the glass is factory adhered to the metal backing attachment plate offering increased shear performance. The system factory sets the reveal or spacing between each subsequent row of glass, requiring minimal to no field adjustment. The glass only needs to be handled once reducing the likelihood of damage.

The present invention includes a mounting bracket adhered on a back of a panel. The mounting bracket includes hooks facing downward. A second mounting bracket may be screw-fastened to a wall with hooks facing upwards. Glass can be placed against wall in final position and finely aligned before being permanently anchored. The glass mount and the wall mount brackets interlock to form straight structural tube. The glass hangs on the wall increasing system rigidity with the glass mount parallel to the wall attachment with even only one mounting bracket used in the case of a single glass panel being mounted on the wall through such means. The forced parallelism of double hook tube prevents prying or peeling of the mount from the glass panel ensuring force remains shear and even. The design allows two mounting brackets to provide the same support as 5 clips without twisting force, without the possibility of metal to glass contact, and while remaining fully adjustable after the glass is in place. The hooks are prevented from coming in contact with the glass by the shape of the glass mounting bracket and receiver. The receiving hooks are captured by mounting hook and wedged between the hook and metal structure without the possibility of direct glass contact when installed as directed. The wall mount may be mounted directly to a stud with no need for a wall board as it may provide wall stiffening properties.

Decorative glass may be adhered to a first metal mounting bracket. The mounting bracket may be parallel to the edge of glass at a distance to create a standard reveal. The decorative glass is adhered using a structural architectural adhesive material or adhesive tape to the bracket such that the hooks are facing downward. The mounting brackets may be mounted to the top and bottom edge of the glass and offset back by a small amount typically about 0"-¼". A second mounting bracket is mounted with hole side up placing receiving hooks facing up (in reverse fashion to glass mount) on the wall at stud locations utilizing a screw through the 30 degree angled slots or the upright slots for initial attachment and allowing for slight adjustment after glass is placed in position. Final attachment is made with a screw through the top holes and into the stud.

Each piece of glass is secured to the mounting brackets in such a fashion that it may be mounted to a wall by simply hooking the mounting brackets together. The glass is positioned in final position onto the mounting brackets secured to the wall at top edge. Screws are driven through the mounting holes in the mounting bracket at the top and right of the glass directly into the wall stud creating permanent fixture to the wall. The next piece is placed above the first piece with the glass overhang from the second piece covering the metal tab of the first. The system continues to be installed in such a manner until the wall is fully covered.

The wall mounted bracket at the gap between pieces of glass is adjustable from the front allowing a grid pattern of glass to be surface mounted from the front to the wall where each successive piece of glass covers the exposed metal wall mounting attachment plate of the preceding piece below. The unique offset nature of the wall mounting attachment plate enables the glass area of the upper piece to cover the metal wall mounting attachment plate. Where each upper panel and lower panel meet, they share the wall mounted bracket to keep panels parallel with each other. The lower hook of the wall mounting attachment supports the top of the lower panel and the upper hook of the wall mounting attachment supports the bottom of the upper panel simultaneously.

The present invention may include the following benefits: 1) keeps the mounts parallel to each other and the wall; 2) provides 250% of the surface area for adhesions and wall contact; 3) allows for adjustment of the panel position after the glass is in place; 4) enables two pieces of glass to be positioned from one wall mount and kept parallel to each other; 5) forms a tube that locks tight to create a strong and parallel mount incapable of peeling from the panel; 6) has positioning/guiding ridges built in at about 1/16" spacing next to the slots to aid in making adjustments; 7) the slots allow for repositioning before locking in with the final screw without re-tapping and removal of the screw while the glass is in place; 8) has about 1 1/16" channels to guide and accept 1" adhesive tape making the application of structural adhesive tape simple and easy; and 9) the mounting hooks are positively in contact because of the ability of the upper mounting to be adjusted after the glass is hung.

Figure 4:
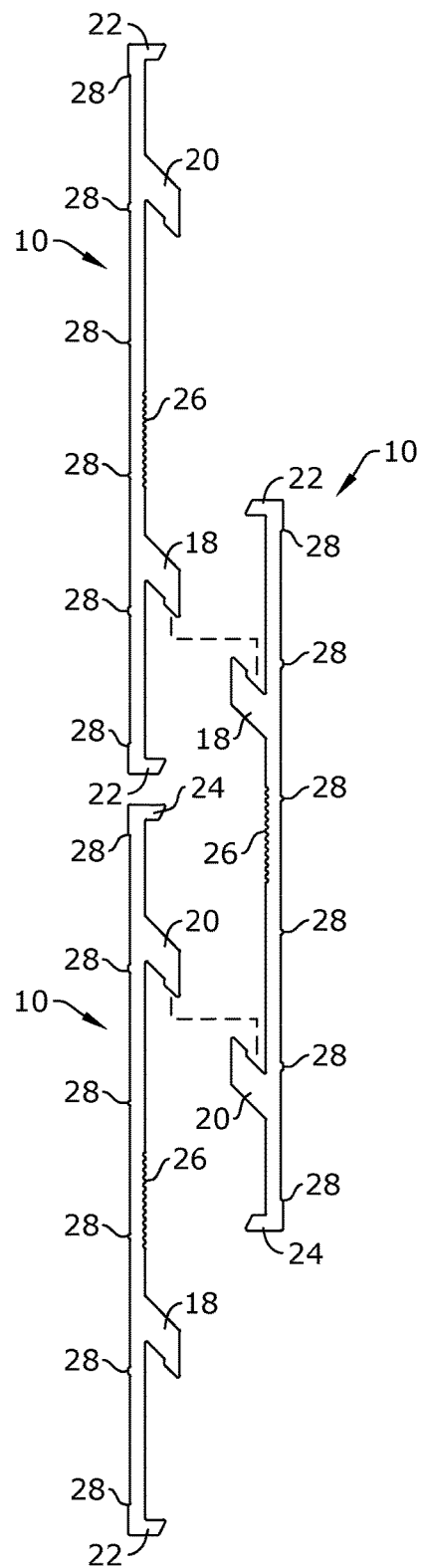
FIG. 4 is a side view of an embodiment of the present invention, showing the offset nesting of two mounting brackets.
Figure 5:
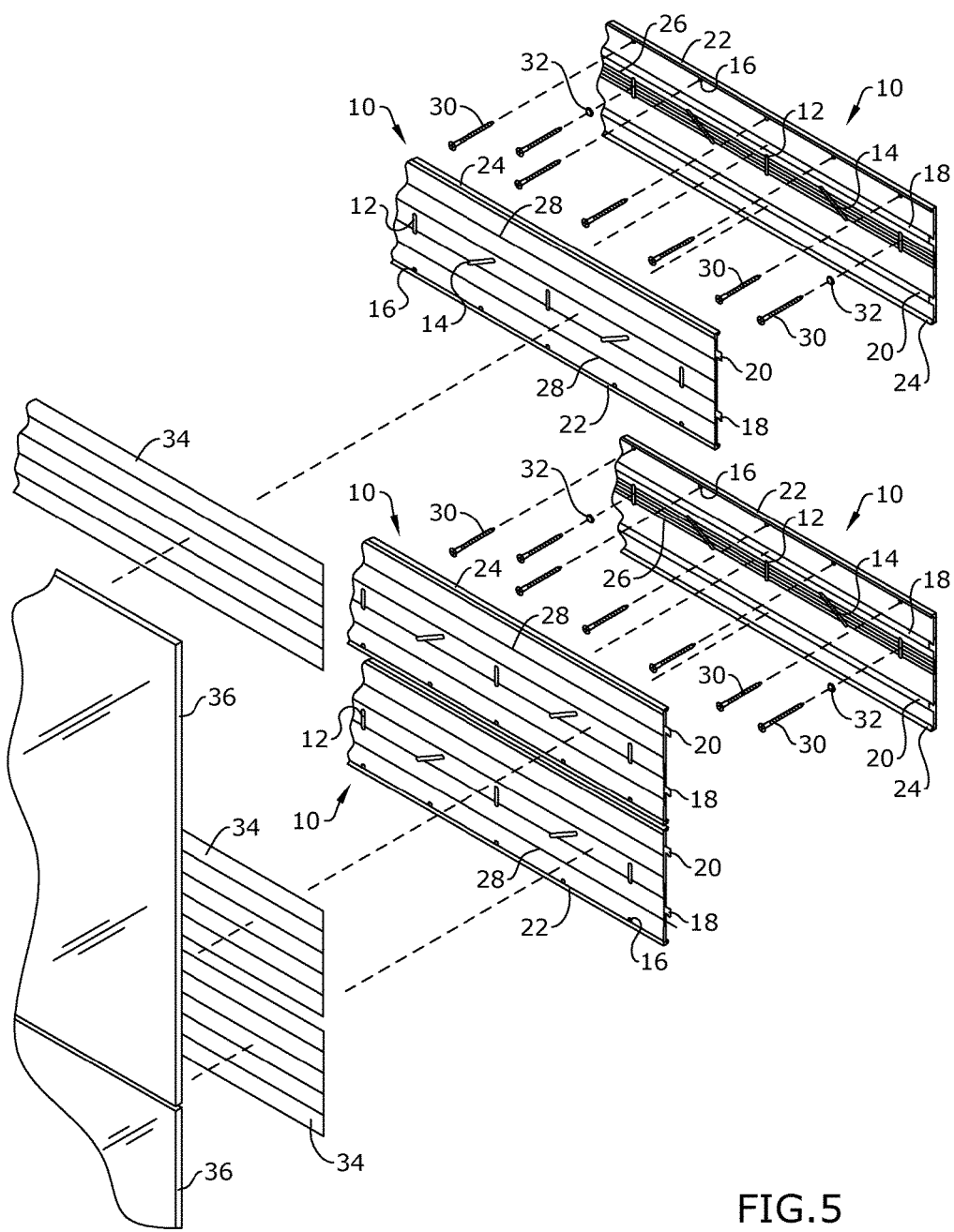
FIG. 5 is a detail exploded view of an embodiment of the present invention.
Figure 6:
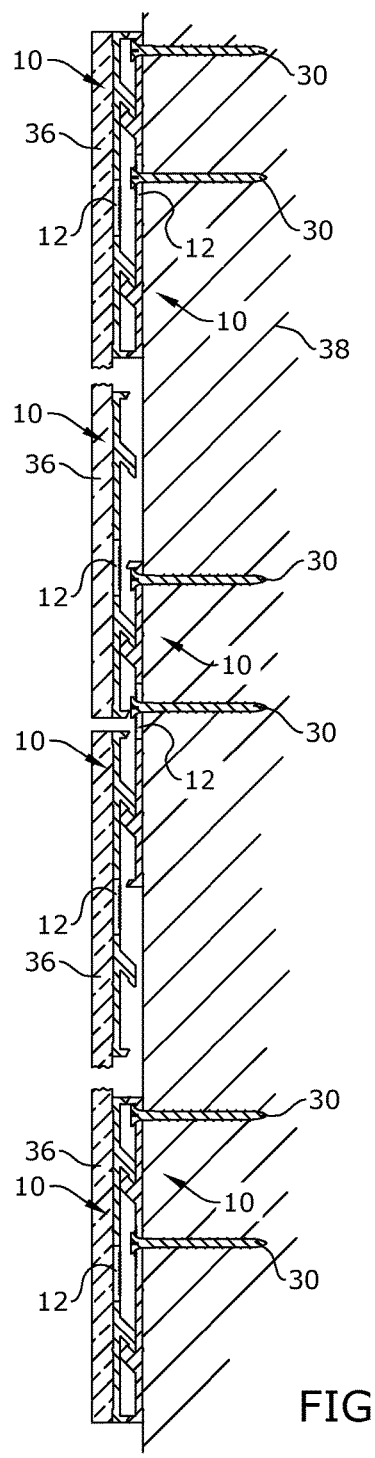
FIG. 6 is a section view of an embodiment of the present invention, taken along line 6-6 in FIG. 1.
Figure 7:
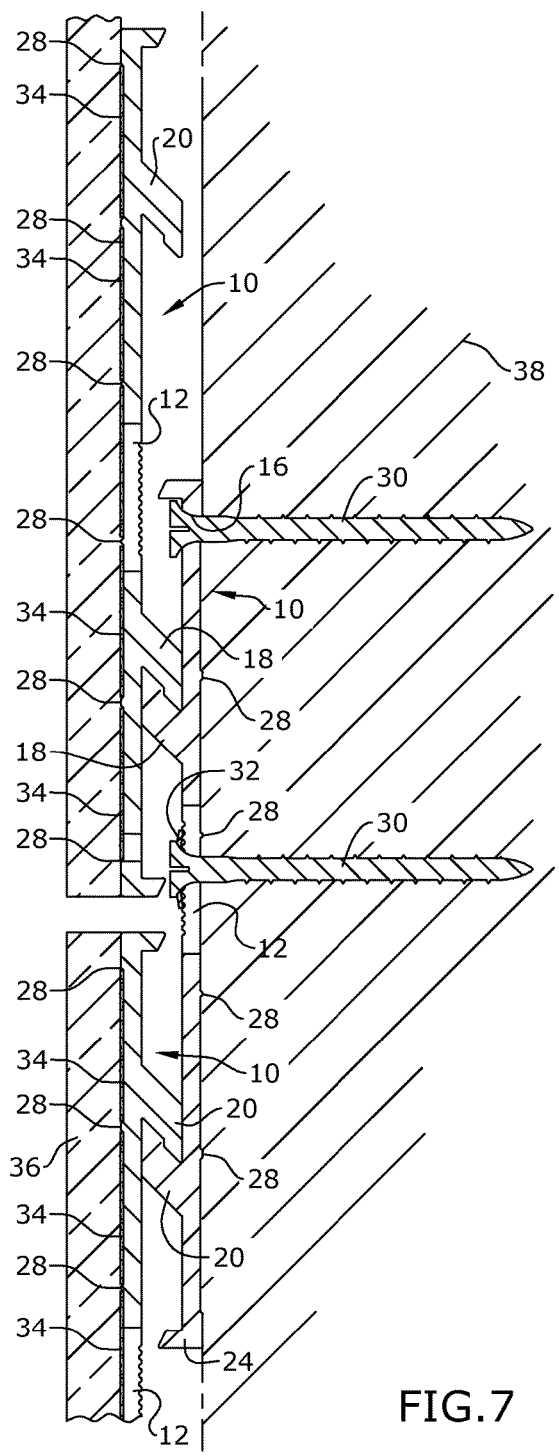
FIG. 7 is a detail section view of an embodiment of the present invention.

Referring to FIGS. 1 through 7, the present invention includes a plurality of mounting brackets 10 used for mounting decorative panels 36 to walls 38. The mounting brackets 10 may be identical to one another. The mounting brackets 10 may each include a substantially planar body having a front surface, a rear surface, a top end and a bottom end forming a height in between, and a first end and a second end, forming a length in between. The mounting brackets 10 further include at least one hook rail 18, 20 protruding from the front surface of the body at an angle relative to the front surface. The hook rail 18, 20 runs along at least a portion of the length of the body. The mounting brackets 10 may further include a plurality of apertures 12, 14, 16 running through the body and sized to receive screws 20 therethrough to secure to the wall 38. When mounting the panels 36 to the walls, a hook rail 18, 20 of a first mounting bracket 10 is interlocked with a hook rail 18, 20 of a second mounting bracket 10 when the height of the second mounting bracket 10 is disposed in an upside down position relative to the first mounting bracket 10.

In certain embodiments, the at least one hook rail 18, 20 includes an upper hook rail 18 and a lower hook rail 20. The upper hook rail 18 and the lower hook rail 20 may run substantially parallel relative to one another along the entire length of the mounting bracket 10. The upper hook rail 19 and the lower hook rail 20 may disposed at the same angel relative to the front surface. The upper hook rail 18 and the lower hook rail 20 may each include an angled body and a flanged tip. The flanged tip of a first mounting bracket 10 may fit in between the flanged tip and the inner surface of a second mounting bracket 10, thereby interlocking.

The plurality of apertures may be in the form of circular holes 16 and elongated slots 12, 14. A plurality of circular holes 16 may be disposed near the top end of the body. The plurality of circular holes 16 may be sized to receive screws 30 therethrough. The screws 30 are driven into studs of a wall 38, thereby securing the mounting bracket 10 to the wall. The plurality of elongated slots 12, 14 may be disposed in between the upper hook rail 18 and the lower hook rail 20. The plurality of slots 12, 14 may include a plurality of vertical slots 12 and a plurality of angled slots 14 relative to the height of the body. The slots 12, 14 allow the glazier to adjust the mounting brackets 10 prior to permanently fixing the mounting brackets 10 to the walls. For example, a screw 30 may be driven through one of the slots 12, 14 and into the wall 38. The mounting bracket 10 of the panel 36 may be attached to the mounting bracket 10 that is attached to the wall 38. If adjustment is needed, the mounting bracket 10 attached to the wall 38 may be moved up and down as well as side to side along the slots for alignment. Once aligned, screws 30 may be driven through the circular holes 16.

In certain embodiments, a plurality of screw alignment ridges 26 may be formed along the length of the body of the mounting bracket 10. The plurality of slots 12, 14 may be formed through the screw alignment ridges 26. In such embodiments, the present invention may utilize countersunk washers 32. The screws 30 may run through the countersunk washers 32 and one of the plurality of slots 12, 14 and into the wall 38. The countersunk washers 32 may be pressed in between the screw alignment ridges 26, thereby preventing the screws 30 from shifting within the slots 12, 14.

The present invention may further include a first leg 22 and a second leg 24. The first leg 22 may protrude from the top end of the inner surface and the second leg 24 may protrude from a bottom end of the inner surface. In such embodiments, when a first bracket 10 is aligned and secured to a second bracket 10 via the hook rails 18, 20, a first leg 22 of the first bracket 10 may press against a second leg 24 of the second bracket 10 and a second leg 24 of the first bracket 10 may press against the first leg 22 of the second bracket 10, thereby adding stability and alignment.

In certain embodiments, the panels 36 may be adhered to the rear surface of the mounting brackets 10. In such embodiments, the rear surface of the mounting brackets 10 may include a plurality of evenly spaced ridges 28 running along the length and spaced between one another along the height. Adhesive strips 34 may be disposed in between the spaced ridges 38. The panels 36 are then adhered to rear surface of the mounting brackets 10 by the adhesive strips 34. The panels 36 may include decorative panels, such as a decorative glass panels.

A method of mounting a panel to a wall may include the following steps: providing a first mounting bracket; providing a second mounting bracket; fastening the rear surface of the first mounting bracket to a wall using a plurality of screws running through the plurality of apertures and into the wall; fastening the rear surface of the second mounting bracket to the panel; and interlocking the at least one hook of the second mounting bracket to the at least one hook of the first mounting bracket.

The present invention enables glaziers to mount glass to walls from the front and align glass before physically attaching to wall in a permanent fashion. The wall mounting attachment bracket may be laser leveled and put into position to allow simple hanging and final adjustment from the front. Each piece of glass is secured to mounting brackets in such a fashion to allow simple mounting to the wall. Glass is positioned in final position with top of wall mounting attachment metal accessible from front at the top. The glazier simply adjusts the level of the top mount with guided and calibrated slots and fastens the top screws into a stud when final fine adjustment is made creating permanent fixture of mounting bracket to the wall. The next piece is placed above the first piece with the glass overhang from the second piece covering the remaining part of the wall mounting bracket. This precisely sets the reveal. The system continues to be installed in such a manner until the wall is fully covered. A trim piece is inserted into or on top of final resulting metal tab to cleanly finish the mounting system. The system of the present invention may include additional pieces of glass to cover mounting attachment brackets leaving no exposed mounting brackets. Glass can be placed against wall in final position and aligned before being permanently anchored. The mounting system allows glass to be mounted quickly, safely, and economically in an aligned fashion with minimum effort. The system improves on the safety of the finished product as the glass is fully adhered to the metal backing plate offering increased shear performance.

It should be understood, of course, that the foregoing relates to exemplary embodiments of the invention and that modifications may be made without departing from the spirit and scope of the invention as set forth in the following claims.

What is claimed is:

1. A method of mounting a panel to a wall comprising:
   providing a first mounting bracket comprising a front surface, a rear surface, a top end, a bottom end, a plurality of holes formed along the top end, a plurality of elongated slots formed in between the plurality of holes and the bottom end, wherein the plurality of elongated slots comprise at least one vertical slot and at least one angled slot and at least one hook rail protruding from the front surface at an angle relative to the front surface, wherein the at least one hook rail extends along at least a portion of a length of the front surface;
   providing a second mounting bracket comprising a front surface, a rear surface, and at least one hook rail protruding from the front surface at an angle relative to the front surface, wherein the at least one hook rail extends along at least a portion of a length of the front surface;
   fastening the rear surface of the first mounting bracket to a wall by driving at least one screw through at least one of the at least one vertical slot and the at least one angled slot and into the wall;
   adjusting the first mounting bracket by moving the first mounting bracket relative to the at least one screw disposed within one of the at least one vertical slot and the at least one angled slot;
   fixing the rear surface of the first mounting bracket to the wall by driving at least one screw through the at least one hole;
   fastening the rear surface of the second mounting bracket to the panel; and
   interlocking the at least one hook rail of the second mounting bracket to the at least one hook rail of the first mounting bracket.

2. The method of claim 1, wherein the first mounting bracket and the second mounting bracket are identical.

3. The method of claim 1, wherein the at least one hook rail of the first mounting bracket and the second mounting bracket each comprise an upper hook rail and a lower hook rail running substantially parallel along the length of the front surface.

* * * * *